United States Patent
Kim et al.

(10) Patent No.: US 12,322,142 B2
(45) Date of Patent: Jun. 3, 2025

(54) METHOD OF SYNTHESIZING 3D JOINT DATA BASED ON MULTI-VIEW RGB-D CAMERA

(71) Applicant: Electronics and Telecommunications Research Institute, Daejeon (KR)

(72) Inventors: Jong Sung Kim, Daejeon (KR); Seong Il Yang, Daejeon (KR); Minsung Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 284 days.

(21) Appl. No.: 18/070,924

(22) Filed: Nov. 29, 2022

(65) Prior Publication Data
US 2024/0029307 A1    Jan. 25, 2024

(30) Foreign Application Priority Data
Jul. 25, 2022 (KR) .................. 10-2022-0091761

(51) Int. Cl.
*G06T 7/80* (2017.01)
*G06V 40/10* (2022.01)

(52) U.S. Cl.
CPC .............. *G06T 7/85* (2017.01); *G06V 40/10* (2022.01); *G06T 2207/10024* (2013.01)

(58) Field of Classification Search
CPC .. G06T 7/85; G06T 2207/10024; G06V 40/10
See application file for complete search history.

(56) References Cited

U.S. PATENT DOCUMENTS

| | | |
|---|---|---|
| 8,405,717 B2 | 3/2013 | Kim et al. |
| 2015/0022669 A1 | 1/2015 | Hall |
| 2017/0270654 A1* | 9/2017 | Eldar .................. G06T 7/80 |
| 2019/0180422 A1 | 6/2019 | Chu et al. |
| 2021/0312707 A1* | 10/2021 | Liang ................ G06T 17/00 |
| 2022/0189113 A1* | 6/2022 | Seo .................... G06T 7/55 |
| 2022/0309710 A1* | 9/2022 | Li ..................... G06T 7/90 |
| 2022/0345684 A1* | 10/2022 | Zhang ............. H04N 13/239 |

FOREIGN PATENT DOCUMENTS

| | | |
|---|---|---|
| KR | 10-2017949 | 9/2019 |
| KR | 10-2152436 | 9/2020 |
| KR | 10-2186220 | 12/2020 |
| KR | 10-2375135 | 3/2022 |

* cited by examiner

*Primary Examiner* — Mohamed A. Wasel
(74) *Attorney, Agent, or Firm* — KILE PARK REED & HOUTTEMAN PLLC

(57) ABSTRACT

A method of synthesizing 3D joint data may include converting joint data collected from a depth camera of each of a plurality of RGB-D cameras from a depth camera coordinate system of each of the RGB-D cameras to a color camera coordinate system of each of the RGB-D cameras, and calculating a confidence level of the joint data converted to the color camera coordinate system using a 3D joint recognition algorithm based on the joint data converted to the color camera coordinate system. The method may further include applying a rotation matrix and a translation vector to the joint data and converting the joint data to a predetermined reference coordinate system, and obtaining a weighted-average of the joint data converted to the reference coordinate system using a weight calculated based on the confidence level to synthesize the joint data.

15 Claims, 7 Drawing Sheets

METHOD OF SYNTHESIZING 3D JOINT DATA BASED ON MULTI-VIEW RGB-D CAMERA

CROSS-REFERENCE TO RELATED APPLICATION

This application claims priority to and the benefit of Korean Patent Application No. 10-2022-0091761, filed on Jul. 25, 2022, the disclosure of which is incorporated herein by reference in its entirety.

BACKGROUND

1. Field of the Invention

The present invention relates to a method of synthesizing 3D joint data based on a multi-view red green blue-depth (RGB-D) camera. Specifically, the present invention relates to a method of synthesizing 3D joint data collected from a plurality of RGB-D cameras capable of simultaneously acquiring a real-time color image and depth data.

2. Discussion of Related Art

In the case of U.S. Patent Publication No. 2015-0022669 and Korean Registered Patent No. 10-2186220 relating to a multi-view red green blue-depth (RGB-D) camera calibration method, a calibration panel printed with a grid pattern is used separately, and in the case of Korean Registered Patent No. 10-2375135, and Korean Registered Patent No. 10-2017949, a calibration wand or calibration cube equipped with an infrared reflecting or emitting type ball or element is used separately. That is, the conventional RGB-D camera calibration methods mostly require a 3D calibration tool that is separately manufactured.

The calibration panel or calibration cube performs calibration only on a single RGB-D camera due to its small size, and thus is not suitable for a case photographing a large space with a plurality of RGB-D cameras. In addition, in the case of a calibration wand, it takes a long time to perform calibration and the positioning accuracy is low.

RELATED ART DOCUMENTS

Patent Document (PATENT DOCUMENT 1) US 2015-0022669 A1
(PATENT DOCUMENT 2) KR 2186220 B1
(PATENT DOCUMENT 3) KR 2375135 B1
(PATENT DOCUMENT 4) KR 2017949 B1

Non-Patent Document (Non-PATENT DOCUMENT 1) B. K. P. Horn, "Closed-form Solution of Relative rotation using Unit Quaternion", Journal of the Optical Society A, vol. 4, no. 4, pp. 629-642, 1987.
(Non-PATENT DOCUMENT 2) B. K. P. Horn, H, M. Hilden, and S. Negandaripour, "Closed-form Solution of Relative rotation using Orthonormal Matrices", Journal of the Optical Society A, vol. 5, no. 7, pp. 1127-1135, 1988.
(Non-PATENT DOCUMENT 3) D. Eggert, A. Lorusso, and R. Fisher, "Estimating 3-D Right Body Conversion: A Comparison of Four Major Algorithms", Machine Vision Applications, vol. 9, no. 5-6, pp. 272-290, 1997.

SUMMARY OF THE INVENTION

In order to solve the above problems, the present invention is directed to providing a method of synthesizing 3D joint data based on a multi-view red green blue-depth (RGB-D) camera capable of converting a 3D joint of a user recognized through a depth camera among RGB-D cameras into color camera-based data, and then automatically calibrating a multi-view RGB-D camera through a calibration scheme that is applied to multi-view RGB-D camera-based 3D joint data, to expand a 3D motion recognition range, improve precision of joint motion, and resolve joint motion occlusion, and thus enable precise automatic synthesis of user 3D joint data.

The technical objectives of the present invention are not limited to the above, and other objectives may become apparent to those of ordinary skill in the art based on the following description.

According to an aspect of the present invention, there is provided a method of automatically calibrating a multi-view red green blue-depth (RGB-D) camera, the method including: converting joint data for calibration collected from a depth camera of each of a plurality of RGB-D cameras from a depth camera coordinate system of each of the RGB-D cameras to a color camera coordinate system of each of the RGB-D cameras; calculating a confidence level of the converted joint data for calibration using a three-dimensional (3D) joint recognition algorithm based on the converted joint data for calibration; and based on the converted joint data for calibration and the confidence level, calculating a rotation matrix and a translation vector for converting joint data collected from the depth camera of each of the RGB-D cameras from the color camera coordinate system of each of the RGB-D cameras to a predetermined reference coordinate system.

The method may further include calculating a binary gate value of the converted joint data for calibration based on the confidence level and a confidence threshold, wherein the calculating of the rotation matrix and the translation vector includes calculating a rotation matrix and a translation vector for converting joint data collected from the depth camera of each of the RGB-D cameras from the color camera coordinate system of each of the RGB-D cameras to a predetermined reference coordinate system based on the converted joint data for calibration and the binary gate value.

The calculating of the confidence level may include using convolutional pose machines (CPM) as the 3D joint recognition algorithm, and calculating the confidence level based on a belief map value output from the CPM.

The calculating of the rotation matrix and the translation vector may include calculating the rotation matrix and the translation vector using a Horn algorithm based on the converted joint data for calibration and the confidence level.

The calculating of the binary gate value may include when the confidence level is greater than the confidence threshold, setting a binary gate value of the converted joint data for calibration to 1, and when the confidence level is less than or equal to the confidence threshold, setting a binary gate value of the converted joint data for calibration to 0.

The calculating of the rotation matrix and the translation vector may include: adjusting the joint data for calibration such that a weighted average based on the binary gate value for each camera and each joint becomes zero; calculating an inner product weighted sum matrix based on the adjusted joint data for calibration and the binary gate value; calculating the rotation matrix based on the inner product weighed sum matrix; and calculating the translation vector based on the joint data for calibration, the binary gate value, and the rotation matrix.

According to an aspect of the present invention, there is provide a method of synthesizing three dimensional (3D) joint data based on a multi-view red green blue-depth (RGB-D) camera, the method including: converting joint data collected from a depth camera of each of a plurality of RGB-D cameras from a depth camera coordinate system of each of the RGB-D cameras to a color camera coordinate system of each of the RGB-D cameras; calculating a confidence level of the joint data converted to the color camera coordinate system using a 3D joint recognition algorithm based on the joint data converted to the color camera coordinate system; applying a rotation matrix and a translation vector, which are generated in advance, to the joint data converted to the color camera coordinate system to convert the joint data to a predetermined reference coordinate system; and obtaining a weighted-average of the joint data converted to the reference coordinate system using a weight calculated based on the confidence level to synthesize the joint data.

The method may further include calculating a binary gate value of the joint data converted to the color camera coordinate system based on the confidence level and a confidence threshold, wherein the obtaining of the weighted average of the joint data converted to the reference coordinate system to synthesize the joint data may include obtaining a weighted-averaging the joint data converted to the reference coordinate system using a weight calculated based on the binary gate value to synthesize the joint data.

According to an aspect of the present invention, there is provided an apparatus for synthesizing joint data based on a multi-view red green blue-depth (RGB-D) camera, the apparatus including: a joint data collector configured to collect joint data for calibration from a depth camera of each of a plurality of RGB-D cameras; a coordinate transformer configured to convert the joint data for calibration from a depth camera coordinate system of each of the RGB-D cameras to a color camera coordinate system of each of the RGB-D cameras; a confidence level calculator configured to calculate a confidence level of the converted joint data for calibration using a 3D joint recognition algorithm based on the converted joint data for calibration; and a rotation matrix and translation vector calculator configured to calculate a rotation matrix and a translation vector for converting data from the color camera coordinate system of each of the RGB-D cameras to a predetermined reference coordinate system based on the converted joint data for calibration and the confidence level of the converted joint data for calibration.

The apparatus may further include a joint data synthesizer, wherein the joint data collector may be configured to collect joint data for synthesis from the depth camera of each of the RGB-D cameras, the coordinate transformer may be configured to convert the joint data for synthesis from the depth camera coordinate system of each of the RGB-D cameras to the color camera coordinate system of each of the RGB-D cameras, and convert the joint data for synthesis converted to the color camera coordinate system to the reference coordinate system using the rotation matrix and the translation vector, the confidence level calculator may be configured to calculate a confidence level of the joint data for synthesis, which is converted to the color camera coordinate system, using a 3D joint recognition algorithm based on the joint data for synthesis converted to the color camera coordinate system, and the joint data synthesizer may be configured to use a weight calculated based on the confidence level of the joint data for synthesis converted to the color camera coordinate system to obtain a weighted-average of the joint data for synthesis, which is converted to the reference coordinate system to synthesize the joint data for synthesis.

The confidence level calculator may be configured to calculate a binary gate value of the converted joint data for calibration based on the confidence level and a confidence threshold, the rotation matrix and translation vector calculator may be configured to calculate a rotation matrix and a translation vector for converting joint data collected from the depth camera of each of the RGB-D cameras from the color camera coordinate system of each of the RGB-D cameras to a predetermined reference coordinate system based on the converted joint data for calibration and the binary gate value.

The confidence level calculator may be configured to use convolutional pose machines (CPM) as the 3D joint recognition algorithm, and calculate the confidence level based on a belief map value output from the CPM.

The rotation matrix and translation vector calculator may be configured to calculate the rotation matrix and the translation vector using a Horn algorithm based on the converted joint data for calibration and the confidence level.

The confidence level calculator may be configured to, when the confidence level is greater than the confidence threshold, set a binary gate value of the converted joint data for calibration to 1, and when the confidence level is less than or equal to the confidence threshold, set a binary gate value of the converted joint data for calibration to 0.

The rotation matrix and translation vector calculator may be configured to adjust the joint data for calibration such that a weighted average based on the binary gate value for each camera and each joint becomes zero, calculate an inner product weighted sum matrix based on the adjusted joint data for calibration and the binary gate value, calculate the rotation matrix based on the inner product weighed sum matrix, and calculate the translation vector based on the joint data for calibration, the binary gate value, and the rotation matrix.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
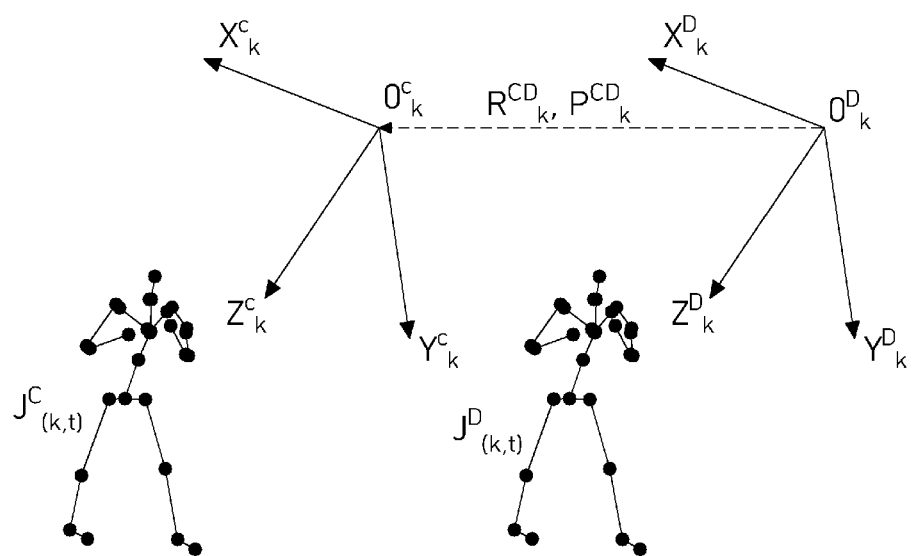
FIG. 1 is a reference view illustrating a process of converting 3D joint data from a depth camera coordinate system to a color camera coordinate system.

The virtual sports market, which started in earnest with businesses such as screen golf and screen baseball, is expanding in size and scope. Recently indoor virtual sports, which conduct exercise/games/matches through VR/AR/XR screen- or headset-based sports content, are using a red, green and blue-depth camera (a RGB-D camera) or a color-depth camera. The RGB-D camera includes a color camera and a depth camera. In a case of a plurality of RGB-D cameras placed in different positions, i.e., based on a multi-view RGB-D camera, a virtual sports experience is provided without being constrained by the user's position or orientation, but in this case, there is a need for not only a task of converting data obtained from a depth camera into color camera-based data but also a task of converting data acquired by each of the RGB-D cameras having different coordinate systems to match a reference coordinate system and integrating (synthesizing) the data into a single 3D dataset.

The conventional method of calibrating a multi-view RGB-D camera for synthesis of 3D joint data requires an additional calibration tool, such as a calibration panel printed with a grid pattern, or a calibration wand or calibration cube provided with an infrared reflective or light emitting ball or element.

The present invention, unlike the conventional 3D calibration tool-based multi-view RGB-D camera calibration method, uses 3D joint data of a user recognized by a RGB-D camera for direct calibration. The present invention obtains a confidence level of the 3D joint data through a 3D joint recognition algorithm, and applies a binary gate calculated based on the confidence level to the calibration, thereby securing the robustness and accuracy of a 3D joint motion synthesis result. The range of joint motion recognition is expanded in proportion to the number of RGB-D cameras used, and through the above-described method, an occlusion problem may also be solved. That is, the present invention, which is a method of synthesizing 3D joint data using 3D joint data based on a multi-view RGB-D camera, may automatically calibrate the multi-view RGB-D camera, and expand the range of motion recognition for 3D joint motion of a user, improve joint motion precision, and resolve joint motion occlusion.

Hereinafter, the advantages and features of the present invention and ways of achieving them will become readily apparent with reference to descriptions of the following detailed embodiments in conjunction with the accompanying drawings. However, the present invention is not limited to such embodiments and may be embodied in various forms. The embodiments to be described below are provided only to complete the disclosure of the present invention and assist those of ordinary skill in the art in fully understanding the scope of the present invention, and the scope of the present invention is defined only by the appended claims. Terms used herein are used to aid in the description and understanding of the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

In the description of the present invention, a detailed description of related technology will be omitted to avoid obscuring the subject matter of the present invention.

Hereinafter, example embodiments of the present invention will be described with reference to the accompanying drawings in detail. For better understanding of the present invention, the same reference numerals are used to refer to the same elements through the description of the figures.

FIG. 1 is a reference view illustrating a process of converting 3D joint data from a depth camera coordinate system to a color camera coordinate system.

In a multi-view RGB-D camera, a depth camera coordinate system of a $k^{th}$ RGB-D camera is defined as $O_k^D$. In the depth camera coordinate system $O_k^D$, the X-axis is denoted by $X_k^D$, the Y-axis is denoted by $Y_k^D$, and the Z-axis is denoted by $Z_k^D$.

In addition, based on the depth camera coordinate system $O_k^D$, a 3×1 vector corresponding to 3D coordinates of an $i^{th}$ joint acquired from a $k^{th}$ depth camera at a time t is defined as $J^D_{(k,i,t)}$. In this case, assuming that the number of joints tracked by the depth camera is N, 3D joint data $J^D_{(k,t)}$ of a user obtained from the $k^{th}$ depth camera at the time t is expressed as Equation 1.

$$J_{(k,t)}^D = \{J_{(k,0,t)}^D, \ldots, J_{(k,N-1,t)}^D\} \qquad \text{[Equation 1]}$$

Next, a color camera coordinate system of the $k^{th}$ RGB-D camera is defined as $O_k^C$. In the color camera coordinate system $O_k^C$, the X-axis is denoted by $X_k^C$, the Y-axis is denoted by $Y_k^C$, and the Z-axis is denoted by $Z_k^C$.

Then, based on the color camera coordinate system $O_k^C$, a 3×1 vector corresponding to 3D coordinates of an $i^{th}$ joint observed by a $k^{th}$ color camera at a time t is defined as $J^C_{(k,i,t)}$. An equation for converting $J^D_{(k,i,t)}$ into $J^C_{(k,i,t)}$, which is a coordinate vector conforming to the coordinate system $O_k^C$ of the $k^{th}$ color camera is represented as shown in Equation 2.

$$J_{(k,i,t)}^C = R_k^{CD} J_{(k,i,t)}^D + p_k^{CD} \qquad \text{[Equation 2]}$$

Here, $R_k^{CD}$ denotes a 3×3 relative rotation matrix from the $k^{th}$ depth camera coordinate system $O_k^D$ to the $k^{th}$ color camera coordinate system $O_k^C$, and $p_k^{CD}$ denotes a 3×1 relative translation vector from the $k^{th}$ depth camera coordinate system $O_k^D$ to the $k^{th}$ color camera coordinate system $O_k^C$. Through Equation 2, the joint data $J^D_{(k,t)}$ acquired from the $k^{th}$ depth camera coordinate system $O_k^D$, as in Equation 1, may be converted into the joint data $J^C_{(k,t)}$ conforming to the $k^{th}$ color camera coordinate system $O_k^C$, and $J^C_{(k,t)}$ may be expressed as Equation 3.

$$J_{(k,t)}^C = \{J_{(k,0,t)}^C, \ldots, J_{(k,N-1,t)}^C\} \qquad \text{[Equation 3]}$$

As described above, the process of converting 3D joint data from the depth camera coordinate system to the color camera coordinate system may be equally applied to all of the RGB-D cameras constituting the multi-view RGB-D camera, and the relative rotation matrix $R_k^{CD}$ and the relative translation vector $p_k^{CD}$ may be obtained during a process of manufacturing the RGB-D camera. This is because the relationship between the coordinate system of the color camera and the coordinate system of the depth camera may be set in the process of manufacturing the RGB-D camera.

Figure 2:
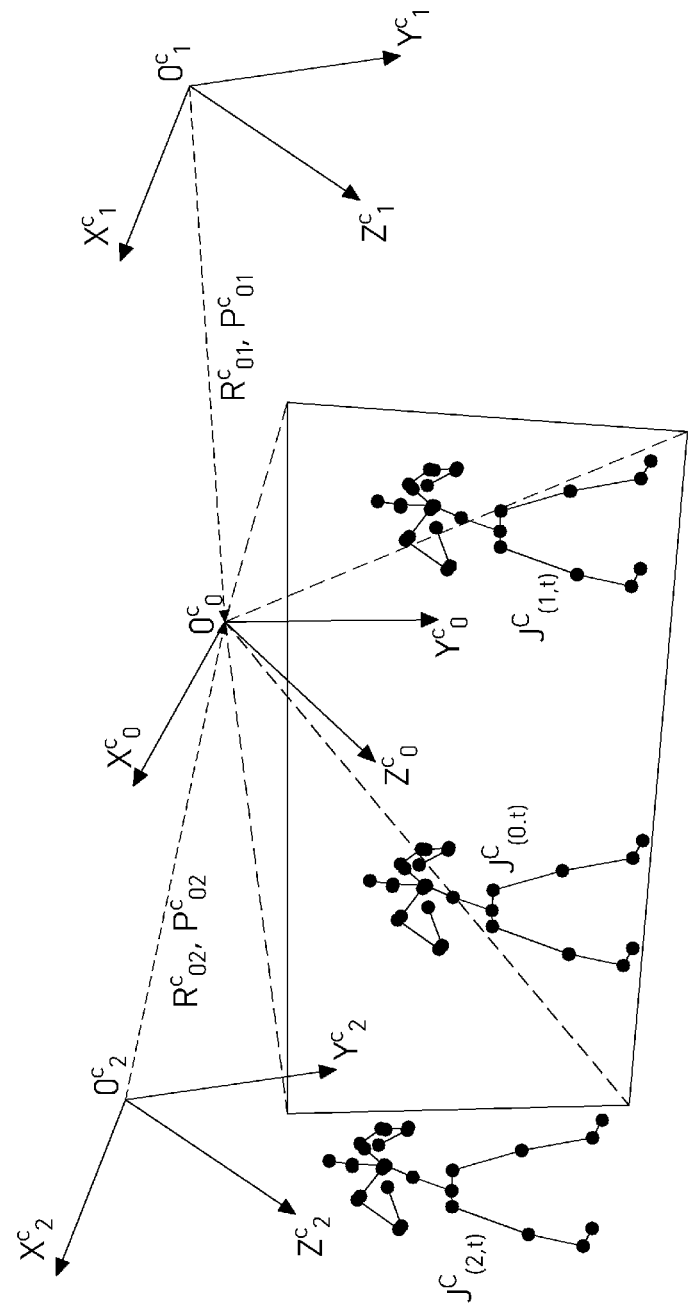
FIG. 2 is a reference view illustrating a process of synthesizing three pieces of 3D joint data obtained from a multi-view RGB-D camera into a single piece of 3D joint data.

In the case of a single-view RGB-D camera, only a process of converting joint data from a depth camera coordinate system to a color camera coordinate system is required as shown in FIG. 1, but in order to acquire 3D joint data of a user based on a multi-view RGB-D camera as shown in FIG. 2, a transformation and integration process between a plurality of different color camera coordinate systems is required.

In the embodiment of the present invention, for the sake of convenience of description, it is assumed that three RGB-D cameras constitute a multi-view RGB-D camera. However, the multi-view RGB-D camera may include not only three RGB-D cameras as in the embodiment of the present invention, but also two cameras or four or more RGB-D cameras.

A multi-view RGB-D camera according to the embodiment of the present invention includes a left RGB-D camera (k=2), a center RGB-D camera (k=0), and a right RGB-D camera (k=1). In this case, there is a need for a process of converting data from a depth camera coordinate system of one RGB-D camera to a color camera coordinate system of the same RGB-D camera, as well as a process of converting 3D joint data from left and right color camera coordinate systems to a central color camera coordinate system, and synthesizing the 3D joint data. In this case, calibration information required for 3D coordinate transformation from the left and right color camera coordinate systems to the central color camera coordinate system may not be acquired in the process of manufacturing the RGB-D camera. Therefore, after actually installing the multi-view RGB-D camera, a process of performing calibration using a separate camera calibration method is required necessarily.

As shown in FIG. 2, in order to synthesize three pieces of 3D joint data each obtained from the multi-view RGB-D camera including three RGB-D cameras into one piece of 3D joint data, a relative rotation matrix $R_{01}^C$ and a relative translation vector $p_{01}^C$ for three-dimensionally converting joint data obtained from the right color camera from the right color camera coordinate system $O_1^C$ to the central color camera coordinate system $O_0^C$ are required, and a relative rotation matrix $R_{02}^C$ and a relative translation vector $p_{02}^C$ for three-dimensionally converting joint data obtained from the left color camera from the left color camera coordinate system $O_2^C$ to the central color camera coordinate system $O_0^C$ are required. The conventional multi-view RGB-D camera-based calibration method uses a calibration tool, such as a calibration panel printed with a grid pattern, or a calibration wand or calibration cube provided with an infrared reflective or light emitting ball or element, to calibrate the relative rotation matrix and relative translation vector. However, according to the present invention, the relative rotation matrices $R_{01}^C$ and $R_{02}^C$ and the relative translation vectors $p_{01}^C$ and $p_{02}^C$ may be precisely calibrated without using such a separate calibration mechanism.

An apparatus for synthesizing joint data according to the present invention collects joint data from each of the depth cameras of the multi-view RGB-D camera, and generates a relative rotation matrix and a relative translation vector based on the collected joint data. Thereafter, the apparatus for synthesizing joint data collects joint data from each of the depth cameras of the multi-view RGB-D camera, and converts each piece of joint data from the depth camera coordinate system of each RGB-D camera to a reference RGB-D camera coordinate system using the pre-generated relative rotation matrices $R_k^{CD}$ and $R_{0k}^C$ and relative translation vectors $p_k^{CD}$ and $p_{0k}^C$, and then synthesizes the converted joint data.

First, the apparatus for synthesizing joint data acquires joint data $\{J_{(0,0)}^C, \ldots \text{ and } J_{(0,T-1)}^C\}$ from the central camera, joint data $\{J_{(1,0)}^C, \ldots, \text{ and } J_{(1,T-1)}^C\}$ from the right camera and joint data $\{J_{(2,0)}^C, \ldots, \text{ and } J_{(2,T-1)}^C\}$ from the left camera during a time T. In this case, the apparatus for synthesizing joint data may apply each piece of 3D joint data $J_{(k,i,t)}^C$ to a known 3D joint recognition algorithm to calculate confidence, and may apply a preset confidence range to the calculated confidence to acquire a confidence level as shown in Equation 4. The 3D joint recognition algorithm is an algorithm that receives an image or joint data and calculates the probability of each joint location by coordinates, that is, confidence. As the 3D joint recognition algorithm, convolutional pose machines (CPM), which is a deep learning-based 3D joint recognition algorithm, may be used, but the 3D joint recognition algorithm used in the present invention is not limited thereto. When the apparatus for synthesizing joint data uses the CPM as the 3D joint recognition algorithm, the confidence level may be calculated based on a value of a belief map output from the CPM.

$$l_{(k,i,t)}^C = \begin{cases} 0 & \text{(none)} \\ 1 & \text{(low)} \\ 2 & \text{(medium)} \\ 3 & \text{(high)} \end{cases} \quad \text{[Equation 4]}$$

$l_{(k,i,t)}^C$ denotes a confidence level of joint data acquired for an $i^{th}$ joint by the $k^{th}$ camera at a time t.

The apparatus for synthesizing joint data according to the present invention uses the confidence level of each piece of joint data for multi-view RGB-D camera calibration, for example, by using the confidence level as a weight in calculating the average of the joint data, or as shown in Equation 5, by calculating a binary gate based on the confidence level and a confidence threshold and then reflecting the binary gate in calculating the average of the joint data. When the binary gate is applied to the calculation of an average of the joint data, joint data with a low confidence level among pieces of joint data acquired from the RGB-D cameras is prevented from being reflected in the calculation of an average of the joint data, and thus the robustness of the calibration result may be secured.

The apparatus for synthesizing joint data may set a binary gate value by assigning a value of 0 as a binary gate value of the corresponding joint data when the confidence level is less than or equal to the confidence threshold, and assigning a value of 1 as a binary gate value of the corresponding joint data when the confidence level is greater than the confidence threshold using Equation 5.

$$b_{(k,i,t)}^C = \begin{cases} 0 & \text{if } l_{(k,i,t)}^C \leq \alpha \\ 1 & \text{if } l_{(k,i,t)}^C > \alpha \end{cases} \quad \text{[Equation 5]}$$

$b_{(k,i,t)}^C$ denotes a binary gate value of joint data acquired for an $i^{th}$ joint by the $k^{th}$ camera at a time t. $\alpha$ (alpha) denotes a confidence threshold.

The confidence level of Equation 4 and the confidence threshold of Equation 5 are only exemplary, and a method of calculating the confidence level or the confidence threshold value may have various modifications.

Hereinafter, a process in which the apparatus for synthesizing joint data generates a relative rotation matrix and a relative translation vector based on joint data and synthesizes pieces of joint data using the generated relative rotation matrix and the generated relative translation vector will be described in detail. The apparatus for synthesizing joint data generates a relative rotation matrix and a relative translation vector based on a modified algorithm of the classic Horn algorithm (Algorithm for relative rotation of Berthold Klaus Paul Horn), and the modified algorithm may be understood by Equations 6 to 11 through description thereof.

First, the apparatus for synthesizing joint data adjusts joint data $J_{(k,i,t)}{}^C$ each acquired from the right, left and central RGB-D cameras during a time T through Equation 6 so that the average of the adjusted joint data $\tilde{J}_{(k,i,t)}{}^C$ becomes 0. The range of joint data leading to the average of 0 may be determined based on at least one of a camera, a joint, and a time or a combination thereof. For example, joint data may be adjusted so that the average of adjusted joint data becomes zero for a combination of each camera and each joint. The time T for which the apparatus for synthesizing joint data acquires joint data is not limited, for example, joint data may be acquired for 1 minute or 5 minutes. As the joint data acquisition time T increases, the accuracy increases. The operation of making the adjusted joint data $\tilde{J}_{(k,i,t)}{}^C$ have an average of 0 is to remove an influence of the translation vector when calculating the relative rotation matrix required for joint data synthesis.

$$\tilde{J}_{(k,i,t)}^C = J_{(k,i,t)}^C - \frac{\sum_{t=0}^{T-1} b_{(k,i,t)}^C J_{(k,i,t)}^C}{\sum_{t=0}^{T-1} b_{(k,i,t)}^C} \quad \text{[Equation 6]}$$

A process in which the apparatus for synthesizing joint data calculates a rotation matrix $R_{01}{}^C$ and a translation vector $p_{01}{}^C$ using the adjusted joint data and the binary gate will be described below. The rotation matrix $R_{01}{}^C$ and the translation vector $p_{01}{}^C$ are provided to three dimensionally convert joint data conforming to the right color camera coordinate system $O_1{}^C$ into joint data conforming to the central color camera coordinate system $O_0{}^C$.

First, the apparatus for synthesizing joint data obtains a matrix $M_{01}{}^C$ (hereinafter referred to as "an inner product weighted sum matrix") with a weighted sum for the inner product of the 3D position coordinate vector of the joint data acquired from the right color camera coordinate system $O_1{}^C$ and the 3D position coordinate vector of the joint data acquired from the central color camera coordinate system $O_0{}^C$. As shown in Equation 7, the apparatus for synthesizing joint data may obtain an inner product weighted sum matrix $M_{01}{}^C$ with an inner product weighted sum of the adjusted joint data (a 3D position coordinate vector) conforming to the right color coordinate system and the adjusted joint data (a 3D position coordinate vector) conforming to the central color coordinate system. In the same way, the apparatus for synthesizing joint data may obtain an inner product weighted sum matrix $M_{02}{}^C$ with an inner product weighted sum of the adjusted joint data (a 3D position coordinate vector) conforming to the left color coordinate system and the adjusted joint data (a 3D position coordinate vector) conforming to the central color coordinate system. In this case, the binary gate value may be used as a weight.

$$M_{01}^C = \sum_{t=0}^{T-1} b_{(1,i,t)}^C b_{(0,i,t)}^C \tilde{J}_{(1,i,t)}^C \tilde{J}_{(0,i,t)}^C \quad \text{[Equation 7]}$$

Then, the apparatus for synthesizing joint data calculates a 4×4 real symmetric matrix $N_{01}{}^C$ from the 3×3 matrix $M_{01}{}^C$ through Equation 8 as follows. In the same way, the apparatus for synthesizing joint data may calculate a 4×4 real symmetric matrix $N_{02}{}^C$.

$$\begin{cases} N_{01(0,0)}^C = M_{01(0,0)}^C + M_{01(1,1)}^C + M_{01(2,2)}^C \\ N_{01(0,1)}^C = M_{01(1,0)}^C = M_{01(1,2)}^C - M_{01(2,1)}^C \\ N_{01(0,2)}^C = M_{01(2,0)}^C = M_{01(2,0)}^C - M_{01(0,2)}^C \\ N_{01(0,3)}^C = M_{01(3,0)}^C = M_{01(0,1)}^C - M_{01(0,1)}^C \\ N_{01(1,1)}^C = M_{01(0,0)}^C - M_{01(1,1)}^C - M_{01(2,2)}^C \\ N_{01(1,2)}^C = M_{01(2,1)}^C = M_{01(0,1)}^C + M_{01(0,1)}^C \\ N_{01(1,3)}^C = M_{01(3,1)}^C = M_{01(2,0)}^C + M_{01(0,2)}^C \\ N_{01(2,2)}^C = -M_{01(0,0)}^C + M_{01(1,1)}^C - M_{01(2,2)}^C \\ N_{01(2,3)}^C = M_{01(3,2)}^C = M_{01(1,2)}^C + M_{01(2,1)}^C \\ N_{01(3,3)}^C = -M_{01(0,0)}^C - M_{01(1,1)}^C - M_{01(2,2)}^C \end{cases} \quad \text{[Equation 8]}$$

$M_{01}{}^C(i,j)$ and $N_{01}{}^C(i,j)$ denote elements of an $i^{th}$ row and a jth column of the 3×3 matrix $M_{01}{}^C$ and the 4×4 real symmetric matrix $N_{01}{}^C$, respectively. The apparatus for synthesizing joint data may generate a 3×3 rotation matrix $R_{01}{}^C$ for three-dimensionally converting joint data from the right color camera coordinate system $O_1{}^C$ to the central color camera coordinate system $O_0{}^C$ using Equation 9.

Specifically, the apparatus for synthesizing joint data may obtain a maximum eigenvalue of $N_{01}{}^C$ by eigen-decomposition (also referred to as "eigendecomposition" or "eigenvalue decomposition") of the 4×4 real symmetric matrix $N_{01}{}^C$, and generate a 3×3 rotation matrix $R_{01}{}^C$ using Equation 9 based on a 4×1 eigenvector $q_{01}{}^C$ corresponding to the maximum eigenvalue. In the same way, the apparatus for synthesizing joint data may generate a rotation matrix $R_{02}{}^C$.

$$\begin{cases} R_{01(0,0)}^C = 1 - 2 \times q_{01(2)}^C \times q_{01(2)}^C - 2 \times q_{01(3)}^C \times q_{01(3)}^C \\ R_{01(0,1)}^C = 2 \times q_{01(1)}^C \times q_{01(2)}^C - 2 \times q_{01(0)}^C \times q_{01(3)}^C \\ R_{01(0,2)}^C = 2 \times q_{01(1)}^C \times q_{01(3)}^C + 2 \times q_{01(0)}^C \times q_{01(2)}^C \\ R_{01(1,0)}^C = 2 \times q_{01(1)}^C \times q_{01(2)}^C + 2 \times q_{01(0)}^C \times q_{01(3)}^C \\ R_{01(1,1)}^C = 1 - 2 \times q_{01(1)}^C \times q_{01(1)}^C - 2 \times q_{01(3)}^C \times q_{01(3)}^C \\ R_{01(1,2)}^C = 2 \times q_{01(2)}^C \times q_{01(3)}^C - 2 \times q_{01(0)}^C \times q_{01(2)}^C \\ R_{01(2,0)}^C = 2 \times q_{01(1)}^C \times q_{01(3)}^C - 2 \times q_{01(0)}^C \times q_{01(2)}^C \\ R_{01(2,1)}^C = 2 \times q_{01(2)}^C \times q_{01(3)}^C + 2 \times q_{01(0)}^C \times q_{01(1)}^C \\ R_{01(2,2)}^C = 1 - 2 \times q_{01(1)}^C \times q_{01(1)}^C - 2 \times q_{01(2)}^C \times q_{01(2)}^C \end{cases} \quad \text{[Equation 9]}$$

$q_{01}{}^C{}_{(i)}$ denotes an $i^{th}$ element of the 4×1 eigenvector $q_{01}{}^C$. As described above, when the 3×3 relative rotation matrix $R_{01}{}^C$ is calculated, the apparatus for synthesizing joint data may generate a 3×1 relative translation vector $p_{01}{}^C$ using Equation 10. In the same way, the apparatus for synthesizing joint data may generate a 3×1 relative translation vector $p_{02}{}^C$.

$$p_{01}{}^C = \tilde{J}_{(0)}{}^C - R_{01} \tilde{J}_{(1)}{}^C \quad \text{[Equation 10]}$$

Here, a weighted average $\tilde{J}_{(k)}{}^C$ of joint data for each camera may be obtained through Equation 11.

$$\hat{J}^C_{(k)} = \frac{\sum_{t=0}^{T-1}\sum_{i=0}^{N-1} b^C_{(k,i,t)} J^C_{(k,i,t)}}{\sum_{t=0}^{T-1}\sum_{i=0}^{N-1} b^C_{(k,i,t)}} \quad \text{[Equation 11]}$$

Figure 3:
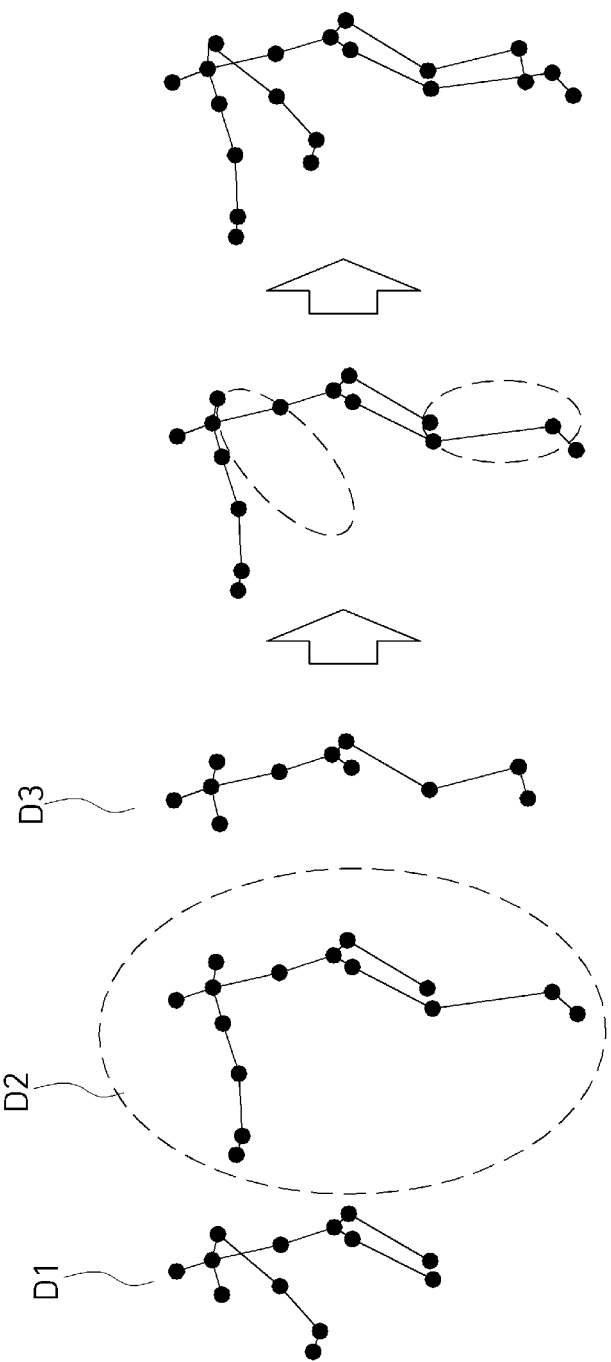
FIG. 3 is a reference view illustrating a process of supplementing a joint, which is not recognized by a specific RGB-D camera, based on joint data obtained from another RGB-D camera through synthesis of pieces of 3D joint data obtained from a plurality of RGB-D cameras.

The range of joint recognition of the multi-view RGB-D camera calibrated through the above process is expanded in proportion to the number of RGB-D cameras used, and through the 3D joint synthesis process as shown in FIG. 3, joint accuracy is improved and the occlusion problem is also resolved. The apparatus for synthesizing joint data may use Equation 12 to apply the rotation matrix and the translation vector obtained through the multi-view RGB-D camera calibration process to joint data obtained from a camera (k≠0) except for the reference RGB-D camera, to thereby obtain a synthesis result of multi-viewpoint 3D joint data according to a camera coordinate system serving as a reference. Equation 12 is provided to obtain a synthesis result $\hat{J}_{(i,t)}{}^C$ of an $i^{th}$ 3D joint at a time t based on the coordinate system of the central RGB-D camera, that is, the $0^{th}$ RGB-D camera. Since binary gate values for each camera, each joint, each view, and each point of time are reflected in Equation 12, and the apparatus for synthesizing joint data may obtain a robust synthesis result by applying the binary gate value.

$$\hat{J}^C_{(i,t)} = \quad \text{[Equation 12]}$$

$$\begin{cases} \frac{b^C_{(0,i,t)} J^C_{(0,i,t)} + \sum_{k=1}^{K-1} b^C_{(k,i,t)}(R^C_{0k} J^C_{(k,i,t)} + p^C_{0k})}{b^C_{(0,i,t)} + \sum_{k=1}^{K-1} b^C_{(k,i,t)}} & \text{if } b^C_{(0,i,t)} + \sum_{k=1}^{K-1} b^C_{(k,i,t)} > 0 \\ \hat{J}^C_{(i,t-1)} & o.w. \end{cases}$$

When 3D joint data obtained from each camera is synthesized through Equation 12, not only joint accuracy may be improved but also the occlusion problem may be solved. In other words, a 3D joint part that is not recognized by a specific camera due to occlusion may be synthesized with joint data recognized by other RGB-D cameras to thereby be supplemented. FIG. 3 illustrates joint data D1, D2, and D3 recognized by different RGB-D cameras, in which an arm part not shown in the joint data D2 is synthesized based on the joint data D1 and supplemented, and a leg part not shown in the joint data D2 is synthesized with the joint data D3 and supplemented.

In the method of synthesizing a 3D joint as in Equation 12, the precision of the synthesized joint data is affected by the threshold value α because the binary gate value is determined according to the threshold value α. The apparatus for synthesizing joint data may synthesize 3D joint data by directly using the confidence level obtained from Equation 4 instead of synthesizing joint data using a binary gate as shown in Equation 12. The apparatus for synthesizing joint data may calculate the synthesizing result using the confidence level as in the example of Equation 13.

$$\hat{J}^C_{(i,t)} = \quad \text{[Equation 13]}$$

-continued $$\begin{cases} \frac{l^C_{(0,i,t)} J^C_{(0,i,t)} + \sum_{k=1}^{K-1} l^C_{(k,i,t)}(R^C_{0k} J^C_{(k,i,t)} + p^C_{0k})}{l^C_{(0,i,t)} + \sum_{k=1}^{K-1} l^C_{(k,i,t)}} & \text{if } l^C_{(0,i,t)} + \sum_{k=1}^{K-1} l^C_{(k,i,t)} > 0 \\ \hat{J}^C_{(i,t-1)} & o.w. \end{cases}$$

Figure 4:
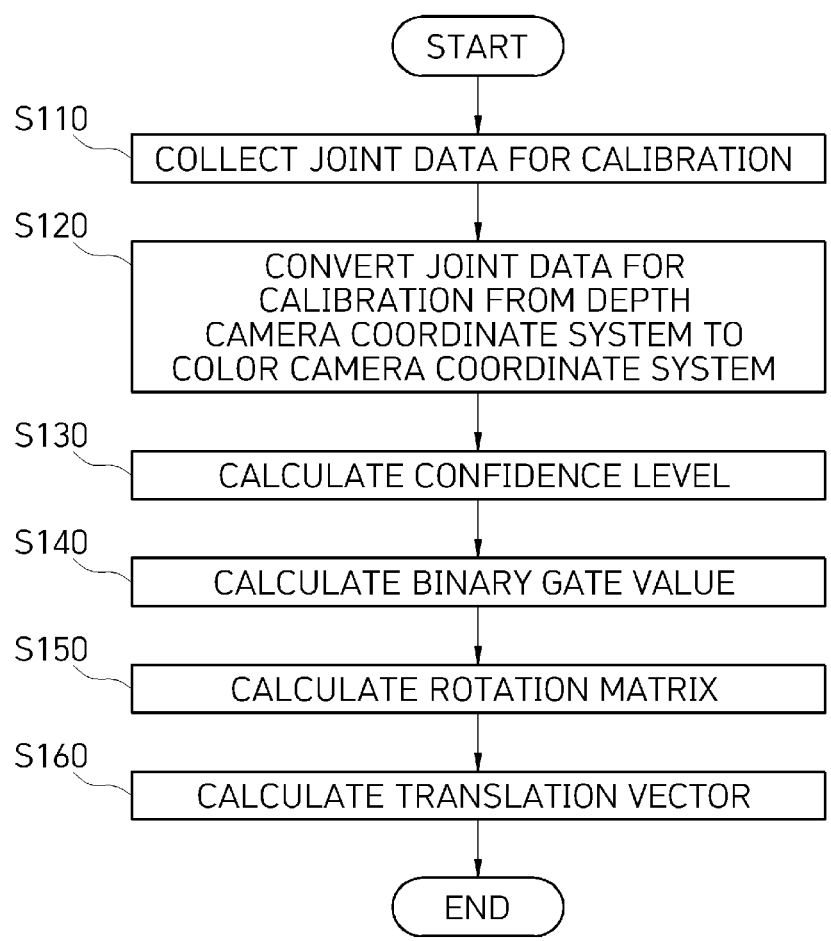
FIG. 4 is a flowchart for describing an automatic calibration method of a multi-view RGB-D camera according to an embodiment of the present invention.

FIG. 4 is a flowchart for describing a method of automatically calibrating a multi-view RGB-D camera according to an embodiment of the present invention.

The method of automatically calibrating a multi-view RGB-D camera according to the embodiment of the present invention includes operations S110 to S160. The method of automatically calibrating a multi-view RGB-D camera may be performed by an apparatus 300 for synthesizing joint data based on a multi-view RGB-D camera (hereinafter referred to as an apparatus for synthesizing joint data).

Operation S110 is an operation of collecting joint data for calibration. The apparatus 300 for synthesizing joint data collects joint data for calibration obtained from depth cameras of a plurality of RGB-D cameras including a reference RGB-D camera. Assuming that the number of joints tracked by the depth camera is N, user joint data $J^D_{(k,t)}$ for calibration obtained from the $k^{th}$ depth camera at a time t may be expressed as Equation 1. The apparatus 300 for synthesizing joint data collects the joint data for calibration from all of the RGB-D cameras included in the multi-view RGB-D camera.

Operation S120 is an operation of converting the joint data for calibration from the depth camera coordinate system to the color camera coordinate system. In the present invention, it is assumed that a rotation matrix $R_k{}^{CD}$ and a translation vector $p_k{}^{CD}$ for converting the joint data from the depth camera coordinate system to the color camera coordinate system are given. Through Equation 2, the apparatus 300 for synthesizing joint data may convert the joint data for calibration $J^D_{(k,t)}$ acquired from the $k^{th}$ depth camera coordinate system $O_k{}^D$, as in Equation 1, into the joint data for calibration $J^C_{(k,t)}$ conforming to the $k^{th}$ color camera coordinate system $O_k{}^C$, and $J^C_{(k,t)}$ may be expressed as Equation 3. The apparatus 300 for synthesizing joint data converts joint data for calibration (hereinafter abbreviated as "joint data" until operation S160) of each of the RGB-D cameras included in the multi-view RGB-D camera from the depth camera coordinate system to the color camera coordinate system of the same RGB-D camera. For example, joint data of an RGB-D camera with a camera identifier of 2 (i.e., k=2) is converted to joint data of a color camera coordinate system of the RGB-D camera with the same camera identifier (k=2).

Operation S130 is an operation of calculating a confidence level. The apparatus 300 for synthesizing joint data may apply the joint data converted to the color camera coordinate system to a known 3D joint recognition algorithm to calculate confidence, and may apply a preset confidence range to the calculated confidence to obtain a confidence level as shown in Equation 4. $l_{(k,i,t)}{}^C$ denotes a confidence level of joint data acquired for an $i^{th}$ joint by the $k^{th}$ camera at a time t.

The 3D joint recognition algorithm is an algorithm that receives an image or joint data and calculates the probability of each joint location by coordinates, that is, confidence. Convolutional pose machines (CPM), which is a deep learning-based 3D joint recognition algorithm, may be used as the 3D joint recognition algorithm, but the 3D joint recognition algorithm applicable in the present invention is not limited thereto. When the apparatus for synthesizing joint data uses the CPM as the 3D joint recognition algorithm, the confidence level may be calculated based on a value of a belief map output from the CPM.

Operation S140 is an operation of calculating a binary gate value. The apparatus 300 for synthesizing joint data calculates a binary gate value of each piece of joint data according to the camera, time, and joint based on the confidence level calculated in operation S130. For example, the apparatus 300 for synthesizing joint data may assign a binary gate value of 1 to the joint data when the confidence level of the joint data is greater than the confidence threshold, and may assign a binary gate value of 0 to the joint data when the confidence level of the joint data is less than or equal to the confidence threshold as shown in Equation 5. $b^C_{(k,i,t)}$ denotes a binary gate value of joint data acquired for an $i^{th}$ joint by the $k^{th}$ camera at a time t.

Operation S150 is an operation of calculating a rotation matrix. The apparatus 300 for synthesizing joint data adjusts joint data $J_{(k,i,t)}{}^C$ obtained from each of the RGB-D cameras k during a time T through Equation 6, so that the average of the adjusted joint data $\tilde{J}_{(k,i,t)}{}^C$ becomes 0. In addition, the apparatus 300 for synthesizing joint data generates an inner product weighted sum matrix for each RGB-D camera (except for a camera serving as a coordinate system reference). The apparatus 300 for synthesizing joint data generates an inner product weighted sum matrix $M_{Ok}{}^C$ based on adjusted joint data and a binary gate value of an RGB-D camera (k=0, hereinafter referred to as "a reference RGB-D camera") that serves as a coordinate system reference and adjusted joint data and binary gate value of a camera (a RGB-D camera other than the reference RGB-D camera, k≠0) that is a target of coordinate system transformation. The apparatus 300 for synthesizing joint data may calculate the inner product weighted sum matrix using Equation 7. Then, the apparatus 300 for synthesizing joint data generates a real symmetric matrix $N_{Ok}{}^C$ based on the inner product weighted sum matrix $M_{Ok}{}^C$. The apparatus 300 for synthesizing joint data may use Equation 8 to generate the real symmetric matrix $N_{Ok}{}^C$. The apparatus 300 for synthesizing joint data may obtain a maximum eigenvalue of the real symmetric matrix $N_{Ok}{}^C$ by eigen decomposition of the real symmetric matrix $N_{Ok}{}^C$, and calculate a rotation matrix $R_{Ok}{}^C$ based on an eigenvector corresponding to the maximum eigenvalue. The rotation matrix $R_{Ok}{}^C$ is a matrix used to three-dimensionally convert joint data conforming to a coordinate system of an RGB-D camera (k≠0), which is not a reference RGB-D camera, into joint data conforming to the reference RGB-D camera coordinate system. The apparatus 300 for synthesizing joint data may use Equation 9 to calculate the rotation matrix.

Operation S160 is an operation of calculating a translation vector. The apparatus 300 for synthesizing joint data may, based on a binary gate value $b^C_{(k,i,t)}$ and joint data $J^C_{(k,i,t)}$ for each camera, generate an average value $\bar{J}_{(k)}{}^C$ of the joint data. Then, the apparatus 300 for synthesizing joint data may, with respect to each conversion target RGB-D camera, generate a translation vector $p_{Ok}{}^C$ based on an average joint data value $\bar{J}_{(k)}{}^C$ the reference RGB-D camera, an average joint data value $\bar{J}_{(k)}{}^C$ of the conversion target RGB-D camera, and a rotation matrix $R_{Ok}{}^C$ between the reference RGB-D camera and the conversion target RGB-D camera. The translation vector $p_{Ok}{}^C$ is a matrix used to three-dimensionally convert joint data conforming to a coordinate system of an RGB-D camera (k≠0), which is not a reference RGB-D camera, to the reference RGB-D camera coordinate system. When joint data conforming to a coordinate system of a RGB-D camera (k≠0) other than the reference camera is multiplied by the rotation matrix $R_{Ok}{}^C$ and then the translation vector $p_{Ok}{}^C$ is added thereto, joint data conforming to the reference RGB-D camera coordinate system is calculated. The apparatus 300 for synthesizing joint data may generate the translation vector using Equations 10 and 11.

Figure 5:
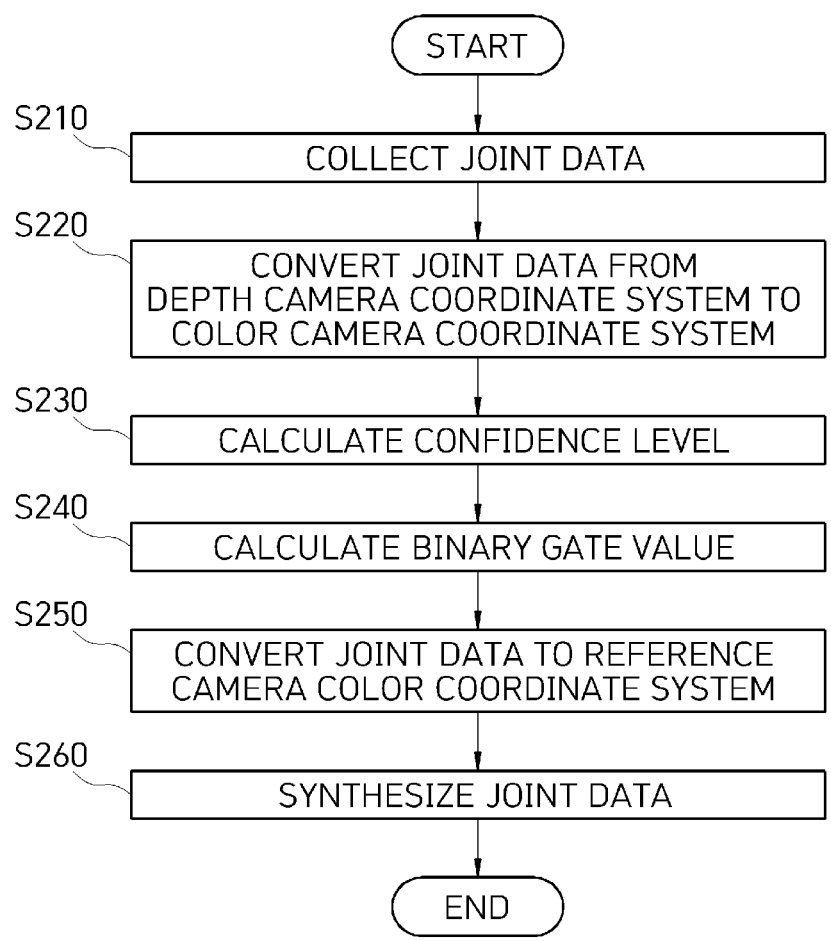
FIG. 5 is a flowchart for describing a method of synthesizing 3D joint data based on a multi-view RGB-D camera according to an embodiment of the present invention.

FIG. 5 is a flowchart for describing a method of synthesizing 3D joint data based on a multi-view RGB-D camera (hereinafter referred to as "a method of synthesizing joint data") according to an embodiment of the present invention.

The method of synthesizing joint data according to the embodiment of the present invention includes operations S210 to S260. Here, operation S240 may be omitted. Although not shown in the drawings, the method of synthesizing joint data may further include operations S110 to S160 of the method of automatically calibrating a multi-view RGB-D camera described above, before operation S210.

Operation S210 is an operation of collecting joint data. The joint data collected in operation S210 is joint data collected for joint motion synthesis by the apparatus 300 for synthesizing joint data. That is, the joint data used from operation S210 to operation S260 is joint data for joint motion synthesis (hereinafter abbreviated as "joint data" until operation S260). Operation S210 has the same details as those of operation S110. The apparatus 300 for synthesizing joint data collects joint data acquired from depth cameras of a plurality of RGB-D cameras including a reference RGB-D camera. Assuming that the number of joints tracked by the depth camera is N, user joint data $J^D_{(k,t)}$ obtained from a $k^{th}$ depth camera at a time t may be expressed as Equation 1. The apparatus 300 for synthesizing joint data collects the joint data from all of the RGB-D cameras included in the multi-view RGB-D camera.

Operation S220 is an operation of converting the joint data from the depth camera coordinate system to the color camera coordinate system. Operation S220 has the same details as those of operation S120. Through Equation 2, the apparatus 300 for synthesizing joint data may convert the joint data Poo acquired from the $k^{th}$ depth camera coordinate system $O_k{}^D$, as in Equation 1, into the joint data $J^C_{(k,t)}$ conforming to the $k^{th}$ color camera coordinate system $O_k{}^C$, and $J^C_{(k,t)}$ may be expressed as Equation 3. The apparatus 300 for synthesizing joint data converts the joint data of each of the RGB-D cameras included in the multi-view RGB-D camera from the $k^{th}$ depth camera coordinate system into joint data of the color camera coordinate system of the same RGB-D camera.

Operation S230 is an operation of calculating a confidence level. The apparatus 300 for synthesizing joint data may apply the joint data converted to the color camera coordinate system to a known 3D joint recognition algorithm, to acquire a confidence level as shown in Equation 4. Operation S230 has the same details as those of operation S130.

Operation S240 is an operation of calculating a binary gate value. The apparatus 300 for synthesizing joint data calculates a binary gate value for each piece of joint data according to the camera, time, and joint based on the confidence level calculated in operation S230. Operation S240 has the same details as those of operation S140.

Operation S250 is an operation of converting the joint data to the color coordinate system of the reference RGB-D camera. The apparatus 300 for synthesizing joint data applies a pre-generated rotation matrix $R^C{}_{Ok}$ and a pre-generated translation vector $p^C{}_{Ok}$ to joint data JC(k,i,t) for an RGB-D camera (k≠0), which is not a reference RGB-D camera, to convert the joint data JC(k,i,t) to the color camera coordinate system of the reference RGB-D camera. As a result, the conversion result of operation S250 becomes $R^C_{0k} J^C_{(k,i,t)} + p^C_{0k}$ (see Equation 12).

Operation S260 is an operation of synthesizing joint data. The apparatus 300 for synthesizing joint data generates a joint data synthesis result by obtaining a weighted-average of the joint data of the reference RGB-D camera and the joint data converted in operation S250. The apparatus 300 for synthesizing joint data may calculate a weight for joint data synthesis using a binary gate value (see Equation 12) or using a confidence level (see Equation 13).

Meanwhile, in the description with reference to FIGS. 4 and 5, each operation may be further divided into a larger number of sub-operations or combined into a smaller number of operations according to examples of implementation of the present invention. In addition, some of the operations may be omitted or may be performed in reverse order as needed. For example, when synthesizing joint data using only the confidence level in operation S260, operation S240 may be omitted. In addition, a plurality of operations may be integrated into one operation. For example, operations S150 and S160 may be integrated to form a single operation, i.e., "an operation of calculating a rotation matrix and a translation vector". In addition, parts omitted in the following description, which have been described above with reference to FIGS. 1 to 3, may be applied to the description of FIGS. 4 to 5. In addition, the descriptions of FIGS. 4 to 5 may be applied to the description of FIGS. 1 to 3.

The method of automatically calibrating a multi-view RGB-D camera and method of synthesizing joint data have been described above with reference to the flowcharts presented in the drawings. While the above methods have been shown and described as a series of blocks for purposes of simplicity, it is to be understood that the invention is not limited to the order of the blocks, and that some blocks may be executed in different orders from those shown and described herein or concurrently with other blocks, and various other branches, flow paths, and sequences of blocks that achieve the same or similar results may be implemented. In addition, not all illustrated blocks may be required for implementation of the methods described herein.

Figure 6:
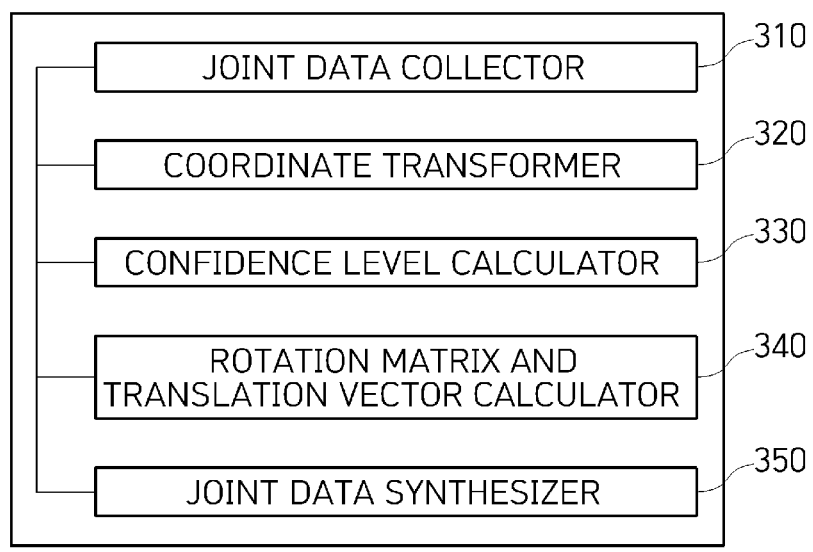
FIG. 6 is a block diagram illustrating a configuration of an apparatus for synthesizing joint data based on a multi-view RGB-D camera according to an embodiment of the present invention.

FIG. 6 is a block diagram illustrating a configuration of an apparatus 300 for synthesizing joint data based on a multi-view RGB-D camera according to an embodiment of the present invention.

The apparatus 300 for synthesizing joint data based on a multi-view RGB-D camera according to the embodiment of the present invention includes a joint data collector 310, a coordinate transformer 320, a confidence level calculator 330, a rotation matrix and translation vector calculator 340, and a joint data synthesizer 350.

The joint data collector 310 collects joint data obtained from depth cameras of a plurality of RGB-D cameras including a reference RGB-D camera. The joint data collected by the joint data collector 310 includes joint data for calibration and joint data for joint motion synthesis. The joint data for calibration is used for calibration of the RGB-D camera. That is, the joint data for calibration is used for the apparatus 300 for synthesizing joint data to generate a rotation matrix and a translation vector for coordinate transformation between RGB-D cameras. The joint data for joint motion synthesis is used to recognize the joint motion of a user.

The coordinate transformer 320 converts joint data from a depth camera coordinate system to a color camera coordinate system of the same RGB-D camera. In addition, the coordinate transformer 320 converts the joint data converted to the color camera coordinate system of each RGB-D camera to a coordinate system of a reference RGB-D camera. The coordinate transformer 320 uses a rotation matrix $R_k^{CD}$ and a translation vector $p_k^{CD}$ to convert joint data conforming to a depth camera coordinate system to a color camera coordinate system of the same RGB-D camera. The rotation matrix $R_k^{CD}$ and the translation vector $p_k^{CD}$ may be set by a manufacturer of the corresponding RGB-D camera.

In addition, the coordinate transformer 320, in order to convert the joint data converted to the color camera coordinate system of each RGB-D camera (k≠0) to the coordinate system of the reference RGB-D camera (k=0), applies a rotation matrix $R^C_{0k}$ and a translation vector $p^C_{0k}$ generated by the rotation matrix and translation vector calculator 340. That is, the coordinate transformer 320 applies the rotation matrix $R^C_{0k}$ and the translation vector $p^C_{0k}$ to the joint data $J^C_{(k,i,t)}$ converted to the color camera coordinate system of each RGB-D camera (k≠0) to convert the joint data $J_{C(k,i,t)}$ to the coordinate system of the reference RGB-D camera (k=0).

The confidence level calculator 330 applies the joint data converted to the color camera coordinate system to a known 3D joint recognition algorithm to calculate a confidence level. The 3D joint recognition algorithm is an algorithm that receives an image or joint data and calculates the probability of each joint location by coordinates, that is, confidence. The confidence level calculator 330 may apply the joint data to a 3D joint recognition algorithm to obtain confidence, and apply a preset confidence range to the confidence to obtain a confidence level as in Equation 4. In addition, the confidence level calculator 330 may apply a confidence threshold based on the confidence level to calculate a binary gate value for each piece of joint data as in Equation 5.

The rotation matrix and translation vector calculator 340 calculates a rotation matrix and a translation vector used to convert joint data to the reference RGB-D camera coordinate system based on the joint data for calibration and the binary gate value of the joint data for calibration. The joint data for calibration is joint data converted to the color camera coordinate system of each RGB-D camera. The rotation matrix and translation vector calculator 340 adjusts joint data $J_{(k,i,t)}^C$ for calibration acquired from each RGB-D camera k during a time T through Equation 6 so that the average of the adjusted joint data $\tilde{J}_{(k,i,t)}^C$ becomes 0. In addition, the rotation matrix and translation vector calculator 340 generates an inner product weighted sum matrix $M_{0k}^C$ for each RGB-D camera (except for a camera serving as a coordinate system reference). The rotation matrix and translation vector calculator 340 generates an inner product weighted sum matrix $M_{0k}^C$ based on adjusted joint data and a binary gate value of a reference RGB-D camera (k=0) and adjusted joint data and binary gate value of a camera (a RGB-D camera other than the reference RGB-D camera, k≠0) that is a target of coordinate system transformation. The rotation matrix and translation vector calculator 340 may calculate the inner product weighted sum matrix $M_{0k}^C$ using Equation 7. Then, the rotation matrix and translation vector calculator 340 generates a real symmetric matrix $N_{0k}^C$ based on the inner product weighted sum matrix $M_{0k}^C$. The rotation matrix and translation vector calculator 340 may use Equation 8 to generate the real symmetric matrix $N_{0k}^C$. The rotation matrix and translation vector calculator 340 may obtain a maximum eigenvalue of the real symmetric matrix $N_{0k}^C$ by eigen decomposition of the real symmetric matrix $N_{0k}^C$, and calculate a rotation matrix $R_{0k}^C$ based on an eigenvector corresponding to the maximum eigenvalue. The rotation matrix $R_{0k}^C$ is a matrix used to three-dimensionally convert joint data conforming to a coordinate system of an RGB-D camera (k≠0), which is not a reference RGB-D camera, into joint data conforming to the reference RGB-D camera coordinate system. The rotation matrix and translation vector calculator 340 may use Equation 9 to calculate the rotation matrix.

The rotation matrix and translation vector calculator 340 may, based on a binary gate value $b^C_{(k,i,t)}$ and joint data $J^C_{(k,i,t)}$ for each camera, generate an average value $\bar{J}_{(k)}^C$ of the joint data. Then, the rotation matrix and translation vector calculator 340 may, with respect to each conversion target RGB-D camera, generate a translation vector $p_{0k}^C$ based on an average joint data value $\bar{J}_{(0)}^C$ of the reference RGB-D camera, an average joint data value $\bar{J}_{(k)}^C$ of the conversion target RGB-D camera, and a rotation matrix $R_{0k}^C$ between the reference RGB-D camera and the conversion target RGB-D camera. The translation vector $p_{0k}^C$ is a matrix used to three-dimensionally convert joint data conforming to a coordinate system of an RGB-D camera (k≠0), which is not a reference RGB-D camera, to the reference RGB-D camera coordinate system. When joint data conforming to a coordinate system of a RGB-D camera (k≠0) other than the reference camera is multiplied by the rotation matrix $R_{0k}^C$ and then the translation vector $p_{0k}^C$ is added thereto, joint data conforming to the reference RGB-D camera coordinate system is calculated. The rotation matrix and translation vector calculator 340 may generate the translation vector using Equations 10 and 11. The rotation matrix and translation vector calculator 340 transmits the generated rotation matrix $R_{0k}^C$ and the generated translation vector $p_{0k}^C$ to the coordinate transformer 320.

The joint data synthesizer 350 generates a joint data synthesis result by obtaining a weighted average of the joint data of the reference RGB-D camera and the joint data collected from cameras other than the reference RGB-D camera but converted to the coordinate system of the reference RGB-D camera. The apparatus 300 for synthesizing joint data may calculate a weight for joint data synthesis using a binary gate value (see Equation 12) or using a confidence level (see Equation 13).

Meanwhile, parts omitted in the description with reference to FIG. 6, which have been described above with reference to FIGS. 1 to 5, may be applied to the description of FIG. 6. In addition, the description of FIG. 6 may be applied to the description of FIGS. 1 to 5.

Figure 7:
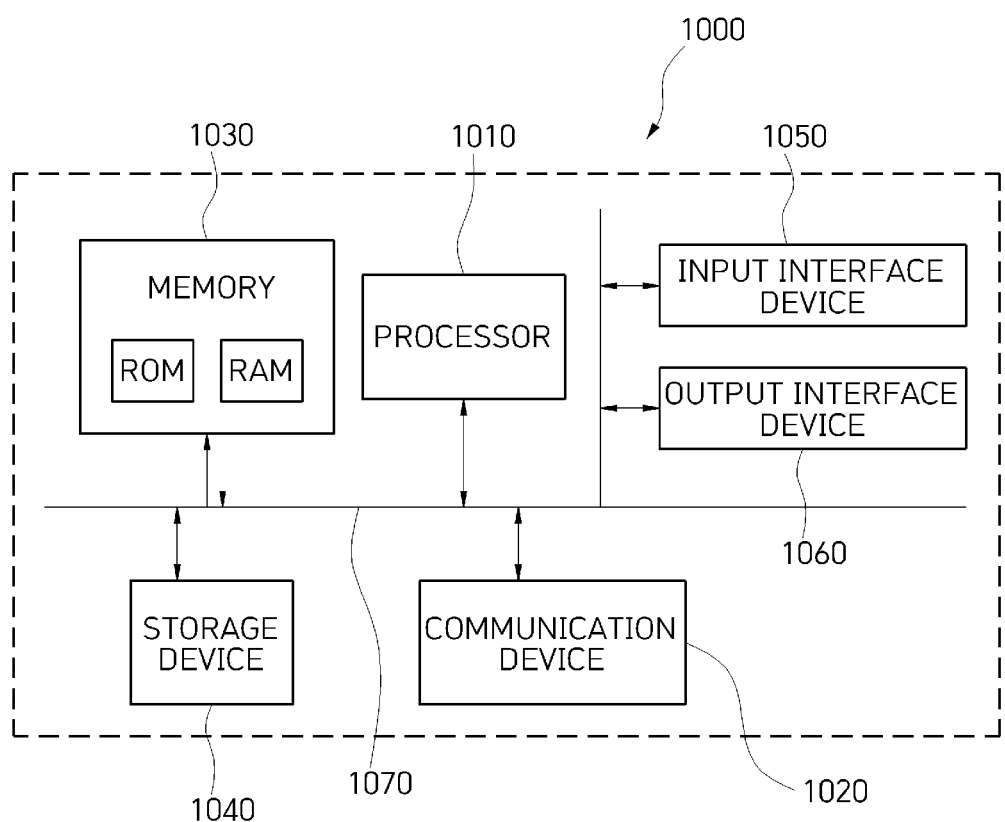
FIG. 7 is a block diagram illustrating a computer system for implementing a method according to an embodiment of the present invention.

FIG. 7 is a block diagram illustrating a computer system using which the present invention is implementable.

A computer system 1000 shown in FIG. 7 may include at least one of a processor 1010, a memory 1030, an input interface device 1050, an output interface device 1060, and a storage device 1040 that are communicated through a bus 1070. The computer system 1000 may further include a communication device 1020 coupled to a network. The processor 1010 may be a central processing unit (CPU) or a semiconductor device for executing instructions stored in the memory 1030 and/or storage device 1040. The memory 1030 and the storage device 1040 may include various forms of volatile or nonvolatile media. For example, the memory 1030 may include a read only memory (ROM) or a random-access memory (RAM). The memory 1030 may be located inside or outside the processor 1010 and may be connected to the processor 1010 through various known means. The memory 1030 may include various forms of volatile or nonvolatile media, for example, may include a ROM or a RAM.

Accordingly, the present invention may be embodied as a method implemented by a computer or non-transitory computer readable media in which computer executable instructions are stored. According to an embodiment, when executed by a processor, computer readable instructions may perform a method according to at least one aspect of the present disclosure.

The communication device 1020 may transmit or receive a wired signal or a wireless signal.

In addition, the method according to the present invention may be implemented in the form of program instructions executable by various computer devices and may be recorded on computer readable media.

The computer readable media may be provided with program instructions, data files, data structures, and the like alone or as a combination thereof. The program instructions stored in the computer readable media may be specially designed and constructed for the purposes of the present invention or may be well-known and available to those having skill in the art of computer software. The computer readable storage media include hardware devices configured to store and execute program instructions. For example, the computer readable storage media include magnetic media such as hard disks, floppy disks, and magnetic tape, optical media such as a compact disc (CD)-ROM and a digital video disk (DVD), magneto-optical media such as floptical disks, a ROM, a RAM, a flash memory, etc. The program instructions include not only machine language code made by a compiler but also high level code that can be used by an interpreter etc., which is executed by a computer.

For reference, the elements according to the embodiment of the present invention may be implemented in the form of software or hardware, such as a field programmable gate array (FPGA) or an application specific integrated circuit (ASIC) and may perform predetermined functions.

However, the "elements" are not limited to meaning software or hardware. Each of the elements may be configured to be stored in an addressable storage medium and configured to reproduce one or more processors.

Accordingly, examples of the elements may include elements such as software elements, object-oriented software elements, class elements, and task elements, processes, functions, attributes, procedures, subroutines, segments of program code, drivers, firmware, microcode, circuits, data, databases, data structures, tables, arrays, and variables.

Elements and functions provided in the corresponding elements may be combined into fewer elements or may be further divided into additional elements.

It should be understood that the blocks and the operations shown in the flowcharts can be performed via computer programming instructions. These computer programming instructions can be installed on processors of programmable data processing equipment, special computers, or general purpose computers. The instructions executed via the processors of programmable data processing equipment or the computers can generate a unit that performs functions described in a block (blocks) of the flow chart. In order to implement functions in a particular manner, the computer programming instructions can also be stored in a computer available memory or computer readable memory that can support computers or programmable data processing equipment. Therefore, the instructions stored in the computer available memory or computer readable memory can produce an article of manufacture containing an instruction unit that performs the functions described in the blocks of the flowchart therein). In addition, since the computer programming instructions can also be installed on computers or programmable data processing equipment, the computer programming instructions can create processes that are executed by a computer through a series of operations that are performed on a computer or other types of programmable data processing equipment so that the instructions executing the computer or other programmable data processing equipment and can provide operations for executing the functions described in a block (blocks) of the flowchart.

In addition, the blocks of the flow chart refer to a part of code, segments or modules that include one or more executable instructions to perform one or more logical functions. It should be noted that the functions described in the blocks of the flow chart may be performed in a different order from the embodiments described above. For example, the functions described in two adjacent blocks may be performed at the same time or in reverse order in some cases.

In the embodiments, the term "— unit," refers to a software element or a hardware element such as a FPGA, an ASIC, etc., and performs a corresponding function. It should, however, be understood that the term "— unit" is not limited to a software or hardware element. The "— unit" may be implemented in addressable storage media. The "— unit" may also be configured to reproduce one or more processors. For example, the "— unit" may include various types of elements (e.g., software elements, object-oriented software elements, class elements, task elements, etc.), processes, functions, achieves, attributes, procedures, sub-routines, segments of program code, drivers, firmware, microcode, circuits, data, databases, data structures, tables, arrays, variables, etc. Functions provided by elements and "~ units" may be combined into fewer elements and "~ units" or may be further divided into additional elements and "~ units." In addition, elements and "~ units" may also be implemented to reproduce one or more CPUs in devices or security multi-cards.

As is apparent from the above, an embodiment of the present invention is implemented to synthesize a 3D joint motion through a new 3D joint calibration technique that directly uses 3D joint data of a user recognized during a certain period of time by a RGB-D camera and joint confidence for calibration, and thus is usable for not only the existing single-view RGB-D camera system but also a multi-view RGB-D camera in indoor virtual sports. Therefore, according to the present invention, the recognition range of a user's 3D motion required for indoor virtual sports can be expanded, joint motion occlusion can be resolved, and the precision of motion can be improved.

An embodiment of the present invention is implemented to robustly and accurately recognize the 3D joint motion of a user moving in a wide space, thereby supporting not only screen sports, in which user activity space is limited and only simple motions are possible, such as screen golf/screen baseball/screen soccer using ball motion recognition and screen-based virtual reality (VR), but also sports events, such as squash, tennis, boxing, and taekwondo, exercise such as fitness, and education-purpose motion games, through content using screen/headset-based Virtual Reality (VR)/Augmented Reality (AR)/eXtended Reality (XR), and thus the application of VR/AR/XR can be expanded to various sports events and user's experience of indoor virtual sports can be enhanced.

The effects of the present application are not limited to the above-described effects, and effects not described may be clearly understood by those of ordinary skill in the art from the present specification and the accompanying drawings.

Although the present invention has been described in detail above with reference to the exemplary embodiments, those of ordinary skill in the technical field to which the present invention pertains should be able to understand that various modifications and alterations may be made without departing from the technical spirit or essential features of the present invention.

What is claimed is:

1. A method of automatically calibrating a multi-view red green blue-depth (RGB-D) camera, the method comprising:
converting joint data for calibration collected from a depth camera of each of a plurality of RGB-D cameras from a depth camera coordinate system of each of the RGB-D cameras to a color camera coordinate system of each of the RGB-D cameras;
calculating a binary gate value of the converted joint data for calibration based on a confidence level and a confidence threshold; and
based on the converted joint data for calibration and the binary gate value, calculating a rotation matrix and a translation vector for converting joint data collected from the depth camera of each of the RGB-D cameras from the color camera coordinate system of each of the RGB-D cameras to a predetermined reference coordinate system.

2. The method of claim 1, further comprising calculating the confidence level of the converted joint data for calibration using a three-dimensional (3D) joint recognition algorithm based on the converted joint data for calibration.

3. The method of claim 2, wherein the calculating of the confidence level includes:
using convolutional pose machines (CPM) as the 3D joint recognition algorithm; and
calculating the confidence level based on a belief map value output from the CPM.

4. The method of claim 1, wherein the calculating of the rotation matrix and the translation vector includes calculating the rotation matrix and the translation vector using a Horn algorithm based on the converted joint data for calibration and the binary gate value.

5. The method of claim 1, wherein the calculating of the binary gate value based on the confidence level and the confidence threshold includes:
when the confidence level is greater than the confidence threshold, setting a binary gate value of the converted joint data for calibration to 1; and
when the confidence level is less than or equal to the confidence threshold, setting a binary gate value of the converted joint data for calibration to 0.

6. The method of claim 1, wherein the calculating of the rotation matrix and the translation vector includes:
adjusting the joint data for calibration such that a weighted average based on the binary gate value for each camera and each joint becomes zero;
calculating an inner product weighted sum matrix based on the adjusted joint data for calibration and the binary gate value;
calculating the rotation matrix based on the inner product weighed sum matrix; and
calculating the translation vector based on the joint data for calibration, the binary gate value, and the rotation matrix.

7. A method of synthesizing three dimensional (3D) joint data based on a multi-view red green blue-depth (RGB-D) camera, the method comprising:

converting joint data collected from a depth camera of each of a plurality of RGB-D cameras from a depth camera coordinate system of each of the RGB-D cameras to a color camera coordinate system of each of the RGB-D cameras;

calculating a binary gate value of the joint data converted to the color camera coordinate system based on a confidence level and a confidence threshold;

applying a rotation matrix and a translation vector, which are generated in advance, to the joint data converted to the color camera coordinate system to convert the joint data to a predetermined reference coordinate system; and obtaining a weighted-average of the joint data converted to the reference coordinate system using a weight calculated based on the binary gate level to synthesize the joint data.

8. The method of claim 7, further comprising calculating the confidence level using a 3D joint recognition algorithm based on the joint data converted to the color camera coordinate system.

9. An apparatus for synthesizing joint data based on a multi-view red green blue-depth (RGB-D) camera, the apparatus comprising:

memory; and a processor connected to the memory and configured execute instructions of the memory to implement:
 a joint data collector configured to collect joint data for calibration from a depth camera of each of a plurality of RGB-D cameras;
 a coordinate transformer configured to convert the joint data for calibration from a depth camera coordinate system of each of the RGB-D cameras to a color camera coordinate system of each of the RGB-D cameras;
 a binary gate value calculator configured to calculate a binary gate value of the converted joint data for calibration using a confidence level and a confidence threshold; and
 a rotation matrix and translation vector calculator configured to calculate a rotation matrix and a translation vector for converting data from the color camera coordinate system of each of the RGB-D cameras to a predetermined reference coordinate system based on the converted joint data for calibration and the confidence level of the converted joint data for calibration.

10. The apparatus of claim 9, wherein the processor configured to execute instructions of the memory further implements a joint data synthesizer, the joint data collector is configured to collect joint data for synthesis from the depth camera of each of the RGB-D cameras, the coordinate transformer is configured to convert the joint data for synthesis from the depth camera coordinate system of each of the RGB-D cameras to the color camera coordinate system of each of the RGB-D cameras, and convert the joint data for synthesis converted to the color camera coordinate system to the reference coordinate system using the rotation matrix and the translation vector, the confidence level calculator is configured to calculate a confidence level of the joint data for synthesis, which is converted to the color camera coordinate system, using a 3D joint recognition algorithm based on the joint data for synthesis converted to the color camera coordinate system, and the joint data synthesizer is configured to use a weight calculated based on the confidence level of the joint data for synthesis converted to the color camera coordinate system to obtain a weighted-average of the joint data for synthesis, which is converted to the reference coordinate system to synthesize the joint data for synthesis.

11. The apparatus of claim 9, wherein binary gate value calculator is configured to calculate the confidence level using a joint recognition algorithm based on the converted joint data for calibration.

12. The apparatus of claim 11, wherein binary gate value calculator is configured to:
 use convolutional pose machines (CPM) as the 3D joint recognition algorithm; and
 calculate the confidence level based on a belief map value output from the CPM.

13. The apparatus of claim 9, wherein the rotation matrix and translation vector calculator is configured to calculate the rotation matrix and the translation vector using a Horn algorithm based on the converted joint data for calibration and binary gate value.

14. The apparatus of claim 9, wherein binary gate value calculator is configured to:
 when the confidence level is greater than the confidence threshold, set a binary gate value of the converted joint data for calibration to 1; and
 when the confidence level is less than or equal to the confidence threshold, set a binary gate value of the converted joint data for calibration to 0.

15. The apparatus of claim 9, wherein the rotation matrix and translation vector calculator is configured to:
 adjust the joint data for calibration such that a weighted average based on the binary gate value for each camera and each joint becomes zero;
 calculate an inner product weighted sum matrix based on the adjusted joint data for calibration and the binary gate value;
 calculate the rotation matrix based on the inner product weighed sum matrix; and
 calculate the translation vector based on the joint data for calibration, the binary gate value, and the rotation matrix.

* * * * *